United States Patent [19]

Hamilton, Jr.

[11] Patent Number: 5,597,547
[45] Date of Patent: Jan. 28, 1997

[54] REDUCTION OF RESIDUAL CHLORIDE IN IRON OXIDES

[75] Inventor: David M. Hamilton, Jr., Houston, Tex.

[73] Assignee: Shell Oil Company, Houston, Tex.

[21] Appl. No.: 421,648

[22] Filed: Apr. 13, 1995

[51] Int. Cl.$^6$ .................................................. C01G 49/02
[52] U.S. Cl. ......................... 423/632; 423/633; 423/634; 423/DIG. 1
[58] Field of Search ................................... 423/632, 633, 423/634, DIG. 1

[56] References Cited

U.S. PATENT DOCUMENTS

| 1,967,235 | 7/1934 | Ferkel. | |
|---|---|---|---|
| 3,928,529 | 12/1975 | Grulke | 423/138 |
| 4,092,401 | 5/1978 | Dreulle | 423/DIG. 1 |
| 4,107,267 | 8/1978 | Hansen | 423/DIG. 1 |
| 4,201,762 | 5/1980 | Daly | 423/633 |
| 5,401,485 | 3/1995 | Hamilton, Jr. | 423/632 |

FOREIGN PATENT DOCUMENTS

| 4739477 | 12/1967 | Japan. | |
|---|---|---|---|
| 59-50028 | 3/1984 | Japan | 423/633 |
| 61-146719 | 7/1986 | Japan | 423/632 |
| 63-222019 | 9/1988 | Japan | 423/632 |
| 1-192729 | 8/1989 | Japan | 423/634 |
| 1-192730 | 8/1989 | Japan | 423/634 |
| 1-192731 | 8/1989 | Japan | 423/633 |
| 2-034519 | 2/1990 | Japan | 423/632 |
| 4-182318 | 6/1992 | Japan | 423/632 |
| 5-043252 | 2/1993 | Japan | 423/633 |

OTHER PUBLICATIONS

Patent Abstracts of Japan—vol. 004, No. 002 (C–069, 9 Jan. 1980 & JP-A-54/138,893 (Mitsui Eng. & Shipbuild Co. Ltd.) 27 Oct. 1979.
Search Report, PCT 17 Jul. 1996, PCT/EP96/01584.
K. Suganuma et al, "Removal of Chloride Ions from Hematite Powders for Ferrite Production", 4th International Conf. on Ferrites, Part I, F. Wang, editor, *Advances in Ceramics*, vol. 15, pp. 81–85 (1986), no month.

*Primary Examiner*—Steven Bos
*Attorney, Agent, or Firm*—Y. Grace Tsang

[57] ABSTRACT

A process for reducing the residual chloride present in iron oxides, particularly in regenerated iron oxides produced from hydrochloric acid waste liquid generated from steel pickling, by post-synthesis treatment of the iron oxides with yellow iron oxide, and subsequently heating the mixture at a temperature sufficient to release at least a part of the crystalline water contained in the yellow iron oxide to facilitate the removal of residual chloride present in iron oxides. The purified regenerated iron oxides are particular suitable for making high-grade ferrites.

2 Claims, No Drawings

REDUCTION OF RESIDUAL CHLORIDE IN IRON OXIDES

FIELD OF THE INVENTION

This invention relates to a process for reducing residual chloride present in regenerated iron oxides by treating the iron oxides with a metal compound containing crystalline water and subsequently heating the mixture at a temperature sufficient to decompose the metal compound to release the crystalline water. This invention is particularly related to a process for reducing residual chloride present in regenerated iron oxides by treating the iron oxides with yellow iron oxides at an elevated temperature.

BACKGROUND OF THE INVENTION

During the last twenty years, the regenerated iron oxides (RIO) produced from hydrochloric acid waste liquid generated from steel pickling have been recognized as an important source of raw material for preparing products containing iron oxides such as high-grade ferrites.

One drawback of utilizing regenerated iron oxides from hydrochloric acid waste liquids generated from steel pickling is that the ferric oxides inevitably contain chloride, typically in the range of about 0.1 to 0.5% measured as grams of chloride per 100 grams of regenerated iron oxide. For the ferrite producers, the chloride ion present in the regenerated iron oxide is not only corrosive to the ferrite manufacturing installations but also injurious to the quality of the ferrite produced.

Reducing the chloride content in regenerated iron oxides by an economical procedure, without significantly changing the ferric oxide quality is believed to be one of the most critical issues for the development of regenerated iron oxides as commercially useful raw materials.

U.S. Pat. No. 1,967,235, issued Jul. 24, 1934 and assigned to K. A. Ferkel, proposes a process for production of metal oxide by contacting metal chloride vapor with water vapor to form a hydrated oxide, which is subsequently calcined to drive off water of hydration and form metal oxide. No mention was made of any method for reducing chloride level in regenerated iron oxides.

Japanese patent application number 47-39477, assigned to TDK Electronics Co, proposes heating beta-FeOOH containing 2.5% chloride at 450° C. to form alpha iron oxide. No mention was made of the removal of chloride impurities from chloride-containing iron oxides.

Suganuma, et al. in 4th International Conference on Ferrites, *Advances in Ceramics,* Vol. 15, 81–85 (1986), reported a method for removing chloride ions from hematite powders by heating the ferric oxide in air with the addition of sulfur dioxide and/or moisture. However, sulfur oxide is a toxic gas which is unhealthy and environmentally undesirable.

Thus, there remains a need for a commercial process which will substantially reduce the chloride contents in regenerated iron oxides (RIO) at a low cost without significantly changing the quality of the iron oxides.

SUMMARY OF THE INVENTION

The present invention relates to a process for reducing the residual chloride present in iron oxides, particularly in regenerated iron oxides (RIO) produced from hydrochloric acid waste liquids generated from steel pickling, by post-synthesis treatment of the iron oxides with a metal compound containing crystalline water and subsequently heating the mixture at a temperature sufficient to release at least a part of the crystalline water contained in the hydrated metal compound to facilitate the removal of residual chloride present in iron oxides. Particularly, the present invention relates to a process for reducing the residual chloride present in iron oxides by treating with yellow iron oxides at an elevated temperature. The purified regenerated iron oxides are particularly suitable for making high-grade ferrites.

DESCRIPTION OF THE EMBODIMENTS

While the present invention is described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims. The present invention is also applicable to the purification of regenerated iron oxides to permit reuse in various applications. It will be apparent to one skilled in the art, optimum operating conditions and concentrations will vary depending upon the properties of the metal compounds being used and the ultimate properties desired by the end users of the purified iron oxides.

The iron oxides to be treated by the process of the present invention in its broadest aspect are selected from any iron oxides of mineral or synthetic origin which contain either trace or substantial amounts of chloride. Various methods for obtaining iron oxides from scrap steel, steel scaling liquors, or iron chloride as industrial waste product have been described in U.S. Pat. No. 4,935,219. The iron oxides obtained from some of these methods inevitably contain residual chlorides originated from the chloride-containing reagents or raw materials present during the process of generating the iron oxides.

As a preferred embodiment, the iron oxides treated in the instant invention are the regenerated iron oxides (RIO) produced from hydrochloric acid waste liquids generated from steel pickling. During the process of producing the regenerated iron oxides, hydrochloric acid pickling wastes are sprayed into a roaster, whereby water and free HCl in the wastes are driven off quickly, while $FeCl_2$ is hydrolyzed to produce iron oxide and hydrogen chloride. The regenerated iron oxides contain chloride, typically in the range of from about 800 parts per million to about 20,000 parts per million, particularly in the range of from about 800 to 5,000 parts per million, and more particularly in the range of from about 800 to 2,000 parts per million by weight of the regenerated iron oxides.

The metal compound(s) suitable for treating iron oxides in the instant invention in its broadest aspect can be any commercial or reagent grade metal compound(s) containing crystalline water which would decompose at elevated temperatures to release crystalline water thereby facilitating the reduction of chloride content in the iron oxides.

The suitability of a metal compound for treating the chloride-containing iron oxides can be determined by first finding the decomposition temperature of the metal compounds. As used herein, a decomposition temperature is the temperature at which the crystalline water or water of hydration is released from a metal compound. Illustrative non-limiting examples for finding the decomposition temperature of a metal compound include (i) looking up in a chemical dictionary or handbook such as *Handbook of Chemistry and Physics* published by Chemical Rubber Company (CRC Handbook), or (ii) running a laboratory test to determine the temperature at which the metal compound decomposes to release water, etc.

As an illustrative example for determining the suitability of a metal compound for treating chloride-containing iron oxides in the present invention, the metal compound containing crystalline water or water of hydration is mixed with an iron oxide containing from about 500 ppm to about 2000 ppm by weight of chloride at a ratio of from about 1:50 to about 2:1 by weight to form an experimental mixture. The experimental mixture is thereafter heated to a temperature from about the decomposition temperature of the metal compound to about 600° C. above the decomposition temperature of the metal compound for a period of time, e.g. from about 10 minutes to about an hour, sufficient to release the crystalline water contained in the metal compound thereby driving off the chloride contained in the iron oxide.

A control of a sample of the same chloride-containing iron oxide is heated under the same condition as the above mixture containing the metal compound and iron oxide, provided that no metal compound is added thereto. After heat treatment, the chloride content of the experimental mixture of iron oxide and metal compound and that of the iron oxide control are determined. A metal compound is considered suitable for treating chloride-containing iron oxide when it causes from about 10 wt % to about 99.9 wt %, preferably from about 20 wt % to about 99.9 wt %, still more preferably from about 25 wt % to about 99 wt % reduction of the chloride contained in the chloride-containing iron oxide when compared with the control. Other factors to consider for selecting a suitable metal compound include, e.g. cost of the metal compound, decomposition temperature, suitability of the metal compound for the end application, etc. In other words, the metal compound can be suitable for removing chloride in the present invention when G, the percentage of the chloride removed by the metal compound, is more than 10% according the following equations:

$$G = A - C$$

$$A = (a - a')/a$$

$$C = (c - c')/c$$

wherein:

G=% chloride removed by metal compound

A=% chloride reduction in mixture

C=% chloride reduction in control a=total amount of chloride in experimental mixture before heating a'=total amount of chloride in experimental mixture after heating c=total amount of chloride in control before heating c'=total amount of chloride in control after heating Not intending to limit the scope of the invention, illustrative examples of possible suitable hydrated metal compounds include, but by no means are limited to, hydrated $K_2O$, $Cr_2O_3$, BaO, NiO, ZnO, MgO, MnO, CuO, CoO, yellow iron oxide (FeOOH), etc. Other suitable hydrated metal compounds can be found by looking up in a chemical dictionary, a chemical catalog, etc. One with ordinary skill in the art would readily be able to find suitable metal compounds by trying different metal compounds, available to him at a price which is economically feasible, using the testing procedure described above. As a preferred embodiment of the present invention, a suitable hydrated metal compound decomposes at a temperature from about 50° C. to about 1400° C., more preferably from about 100° C. to about 900° C., still more preferably from about 200° C. to about 400° C.

As a specific embodiment of the present invention, the hydrated metal compound(s) used in treating iron oxides contain(s) less than 500, preferably less than 100, more preferably less than 10 parts per million by weight of Cl, which can be in the form of chloride, chlorine-containing compound(s) or chlorine atom/molecular, etc.

In a preferred embodiment of the present invention, yellow iron oxide(s) is used for treating chloride-containing iron oxides. Suitable yellow iron oxides include any yellow iron oxide of natural or synthetic origin, such as goethite, lepidocrocite, ochres, siennas, limonite, etc. As a particularly preferred embodiment of the present invention, a synthetic yellow iron oxide is used. The chemical formula for yellow iron oxides is $Fe_2O_3 \cdot nH_2O$. Yellow iron oxides start to lose crystalline water at about 200° C. and will lose almost all of the crystalline water at about 290° C. to about 300° C. After the crystalline water is released, yellow iron oxides become red iron oxides.

As a specific aspect of the preferred embodiment, the suitable yellow iron oxides contain less than 500 ppm, preferably less than 100 ppm, more preferably less than 10 ppm of Cl, which can be in the form of chloride, chlorine-containing compound(s) or chlorine atom/molecular, etc.

The suitable amount of hydrated metal compound(s) for treating iron oxides generally falls in the range from about 1 wt % to about 90 wt %, preferably from about 2 wt % to about 50 wt %, more preferably from about 3 wt % to about 25 wt %, still more preferably about 5 wt % to about 15 wt % based on the total weight of the mixture of chloride-containing iron oxide to be treated and the hydrated metal compound(s).

The chloride-containing iron oxides may be mixed with the hydrated metal compound(s) by any method known to one skilled in the art which would achieve complete mixing of the iron oxides with the hydrated metal compound. As an illustrative non-limiting example, iron oxides may be mulled with the hydrated metal compound(s) and moistened with water, such as deionized water, distilled water, etc. As another illustrative non-limiting example, the iron oxides may also be mulled dry. In a specific embodiment of the present invention, from about 1% to about 90%, preferably from about 5% to about 50%, more preferably from about 8% to about 15% by weight of water, based on the total weight of the mixture, is added during the mulling process.

The mixing of iron oxides with hydrated metal compound(s) can be carried out at a pressure from about 0.1 atm to about 100 atm, preferably from about 0.5 atm to about 5 atm, more preferably from about 0.8 atm to about 1.5 atm. In one specific embodiment of the present invention, the mixing process is carried out under ambient pressure.

The mixing process can be conducted in any suitable atmosphere. Non-limiting examples of the suitable atmosphere include air, other oxygen containing gaseous streams, and inert gaseous streams.

The mixing can be conducted at any suitable temperature, preferably from about 0° C. to about 200° C., more preferably from about 10° C. to about 35° C., still more preferably at ambient temperature.

After the iron oxides are mixed with hydrated metal compound(s) and moistened by the addition of water, the mixture of iron oxides and hydrated metal compound(s) can be separated from the aqueous solution by any suitable separation method. Without intending to limit the scope of the invention, the treated iron oxides can be separated out by filtration, centrifugation, etc.

The mixture of chloride-containing iron oxides and metal compound(s), optionally after being separated from the aqueous solution, are subsequently dried/dehydrated at an elevated temperature to release the crystalline water contained in the hydrated metal compound(s). The drying/dehydration is typically conducted at a temperature ranging from about 30° C. below the decomposition temperature of the metal compound(s) to about 1000° C. above the decomposition temperature, preferably from about decomposition temperature of the metal compound(s) to about 800° C. above the decomposition temperature, or more preferably from about 10° C. above the decomposition temperature to about 600° C. above the decomposition temperature for a period of time sufficient to release the crystalline water contained in the hydrated metal compound(s) and/or to drive off the water along with the chloride contained in the iron oxide(s) from the mixture. Optionally, the mixture is calcined either simultaneous with or subsequent to the drying/dehydration step. Typically, the drying/dehydration and/or calcination step(s) last(s) from about 1 minute to about 100 hours. This dehydration/calcination process can be (i) a simple drying/dehydration process to drive off the crystalline water in the hydrated metal compound(s), (ii) a combined dehydration and calcination step at a temperature both dehydration and calcination will take place, or (iii) a staged dehydration and calcination process. The dehydration/calcination is conducted at a pressure typically from about 0.1 atm to about 10 atm, preferably from about 0.5 to about 5 atm, more preferably from about 0.8 atm to about 1.2 atm. As a specific embodiment of the present invention, the dehydration and/or calcination step can be conducted under ambient pressure. The heating step can be conducted under any suitable atmospheres. Illustrative, non-limiting examples of the suitable atmospheres for the heating step include air, oxygen containing gaseous streams, inert gaseous streams, vacuum, etc.

In one specific embodiment of the present invention, the chloride-containing iron oxides are mixed with metal compound(s) and water. The mixture is first separated from the aqueous solution, and subsequently dehydrated without calcination in air at ambient pressure and at a temperature from about 30° C. below the decomposition temperature to about 1000° C. above decomposition temperature, preferably from about decomposition temperature of the metal compound(s) to about 800° C., or more preferably from about 10° C. above the decomposition temperature to about 600° C. above the decomposition temperature, for a period of time sufficient to release the crystalline water contained in the hydrated metal compound(s) and to drive off the water along with the chloride contained in the iron oxide(s) from the mixture. The dehydration step typically will last for a period of time ranging from about 1 minute to about 72 hours, preferably from about 2 minutes to about one hour, more preferably from about 10 minutes to about 30 minutes. In another specific embodiment of the present invention, the mixture is first dehydrated, and is subsequently calcined for a period of time from about 1 minute to about 72 hours, preferably from about 15 minutes to about 10 hours, more preferably from about 30 minutes to about 2 hours. In still another specific embodiment of the present invention, the mixture is dehydrated and calcined in a one-step procedure at a temperature, which causes the mixture to be calcined and dehydrated for a period of time ranging from about 1 minute to about 72 hours, preferably from about 15 minutes to about 10 hours, more preferably from about 30 minutes to about 2 hours.

As a specific embodiment of the present invention, the containing iron oxides containing an amount of chloride from about 800 parts per million to about 20,000 parts per million, particularly in the range of from about 800 to 5,000 parts per million, and more particularly in the range of from about 800 to 2,000 parts per million by weight of the regenerated iron oxides, such as regenerated iron oxides, are first mixed with yellow iron oxide, containing less than 100 ppm of chloride, in an amount ranging from about 1% to about 90%, preferable from about 2% to about 50%, more preferably from about 3% to about 25%, still more preferably about 5% to about 15% by weight of the total weight of the mixture of chloride-containing iron oxides and the yellow iron oxide. The mixture is mulled at a pressure from about 0.1 atm to about 100 atm, preferably from about 0.5 atm to about 5 atm, more preferably from about 0.8 atm to about 1.5 atm, still more preferably at ambient pressure, for a period of time ranging from about 1 minute to about 72 hours, preferably from about 2 minutes to about one hour, more preferably from about 10 minutes to about 30 minutes, at a temperature from about 0° C. to about 200° C., preferably from about 10° C. to about 35° C., still more preferably at about ambient temperature. Optionally, water, preferably deionized water, in an amount from about 1% to about 100%, preferably from about 5% to about 50%, more preferably from about 8% to about 15% by weight of total mixture, is added to the mixture. Optionally, the aqueous solution is removed from the mixture by filtration, centrifugation, screening, etc. The mixture is subsequently heated to a temperature ranging from about 200° C. to about 1400° C., preferably from about 290° C. to about 1000° C., more preferably from about 500° C. to about 950° C., and still more preferably from about 750° C. to about 900° C. for a period of time from about 1 minute to about 72 hours, preferably from about 15 minutes to about 10 hours, more preferably from about 30 minutes to about 2 hours, at a pressure typically from about 0.1 atm to about 10 atm, preferably from about 0.5 to about 5 atm, more preferably from about 0.8 atm to about 1.2 atm, still more preferably at about ambient pressure. As a specific embodiment of the present invention, the mixture is first heated to from about 150° C. to about 170° C., then gradually raised over a period of time from about 5 minutes to about 5 hours to a temperature from about 750° C. to about 900° C., and held at about this level for from about 1 minute to about 72 hours, preferably from about 15 minutes to about 10 hours, more preferably from about 30 minutes to about 2 hours at a pressure typically from about 0.1 atm to about 10 atm, preferably from about 0.5 atm to about 5 atm, more preferably from about 0.8 atm to about 1.2 atm, still more preferably at about ambient pressure. As a another specific embodiment of the present invention, the temperature is raised first to from about 200° C. to about 500° C., preferably from about 290° C. to about 400° C., and more preferably from about 310° C. to about 370° C. at a pressure typically from about 0.1 atm to about 10 atm, preferably from about 0.5 to about 5 atm, more preferably from about 0.8 atm to about 1.2 atm, still more preferably at about ambient pressure, for a sufficient amount of time to cause to release the crystalline water from the yellow iron oxide, and subsequently calcined at temperature from about 500° C. to about 1400° C., preferably from about 750° C. to about 900° C. for from about 1 minute to about 72 hours, preferably from about 15 minutes to about 10 hours, more preferably from about 30 minutes to about 2 hours.

After the iron oxides are dehydrated and/or calcined, a sample of the iron oxides is analyzed with a suitable analytical method(s) to determine the chloride content. The post-treatment chloride content is compared with the chloride content measured prior to the treatment.

It has been found that by the operation of the process of the present invention, treatment with hydrated metal compound and dehydration, optionally in combination with calcination, effectively facilitates the removal of the residual chloride present in the iron oxides. The chloride content is reduced by from about 10 wt % to about 99.9 wt % based on the weight of the total amount of chloride contained in the untreated iron oxides.

The invention will be illustrated by the following illustrative embodiment which are provided for illustration purpose only and are not intended to limit the scope of the instant invention.

ILLUSTRATIVE EMBODIMENT

The following illustrative embodiment describes typical techniques of the present invention for reducing chloride content in regenerated iron oxides and the typical techniques for measuring the chloride contents of the iron oxides. The chloride contents were determined using Kevex Model 770 Energy Dispersive X-Ray Fluorescence Instrument.

Part A: Regenerated Iron Oxide

The ferric oxide used in the present embodiment is a commercial product of regenerated iron oxide produced from hydrochloric acid waste liquid generated from steel pickling. The chloride content of the regenerated iron oxide was about 1400 parts per million by weight of the regenerated iron oxide measured by Kevex Model 770 Energy Dispersive X-Ray Fluorescence Instrument.

1080 grams of the regenerated iron oxide were used for the Illustrative Embodiment below. The total amount of the chloride present in the 1080 grams of regenerated iron oxide with 1400 parts per million (ppm) of chloride was estimated to be about 1.51 grams or 0.0426 moles based on mathematical calculation.

Part B: Yellow Iron Oxide 120 grams of yellow iron oxide commercially available from Harcros was used in this Illustrative Embodiment.

Part C: Reduction of Chloride in Ferric Oxide

Method I-1: Treated with Yellow Iron oxide & $H_2O$ & Dried & Calcied 1080 grams of the regenerated iron oxide from Part A above were mixed with 120 grams of yellow iron oxide from Part B above to form a mixture with a 10/90 ratio of yellow iron oxide to the regenerated iron oxide. The mixture was mulled for about 15 to 25 minutes. During mulling, 126 milliliters of deionized water were added gradually to the regenerated iron oxide. The wet regenerated iron oxide and yellow iron oxide mixture was filtered through a #7 mesh screen. The filtered iron oxide mixture was put in a static kiln at 170° C. at ambient pressure. The temperature in the kiln is gradually raised during about one hour to 825° C. in air at one atm and was held at 825° C. for about an hour. A sample of the dried and calcined iron oxide mixture was submitted for chloride analysis. The resulted chloride content was 340 parts per million by weight of the total iron oxides as shown in TABLE I below.

Method C-1: Comparative Embodiment 1—Dried & Calcined 600 grams of the regenerated iron oxide from Part A above were mulled for 15 minutes without the addition of any aqueous solution. The mulled iron oxide were then dried for 15 minutes at 170° C. Thirty grams of the dried oxide were calcined in a static kiln under air having one atmosphere pressure for one hour at 825° C. A sample of the calcined iron oxide was submitted for chloride analysis. The resulted chloride content was 810 ppm.

Method C-2: Comparative Embodiment 2—Treated with $H_2O$ & Dried & Calcined 600 grams of the regenerated iron oxide from Part A above were mulled for 15 minutes. During mulling, 63 milliliters of deionized water were gradually added to the regenerated iron oxide. The wet iron oxide powder was filtered through a #7 mesh screen and then dried for 15 minutes at 170° C. Thirty grams of the dried oxide were calcined in a static kiln under air having one atmosphere pressure for one hour at 825° C. A sample of the calcined iron oxide was submitted for chloride analysis. The resulting chloride content was 880 ppm.

TABLE

REGENERATED IRON OXIDE CHLORIDE REDUCTION STUDY

| Sample | Chloride Reduction Method | Treating | Heating Condition | Chloride Content ppm | Chloride Reduction % |
|---|---|---|---|---|---|
| Untreated Commercial RIO | None | None | None | 1400 | — |
| C-1 | Dried & Calcined | None | 170° C. & 825° C. | 810 | 42% |
| C-2 | $H_2O$ Dried & Calcined | $H_2O$ | 170° C. & 825° C. | 880 | 37% |
| I-1 | Yellow Iron Oxide & $H_2O$ & Dried & Calcined | Yellow Iron Oxide & $H_2O$ | 170° C. & 825° C. | 340 | 71% |

The ranges and limitations provided in the instant specification and claims are those which are believed to particularly point out a distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A process for removing chloride from a regenerated iron oxide comprising from about 800 to about 5000 ppm by weight of chloride, wherein said regenerated iron oxide is produced from a hydrochloric acid waste liquid generated from steel pickling, which process comprises the steps of:

(a) mixing the regenerated iron oxide with from about 3 wt % to about 25 wt % of yellow iron oxide containing crystalline water to form a first mixture;

(b) adding from about 1 wt % to about 90 wt % of water to said first mixture obtained from step (a) to form a second mixture; and (c) heating the second mixture to a temperature ranging from about decomposition temperature of the yellow iron oxide to about 800° C. above the decomposition temperature of the yellow iron oxide at a pressure from about 0.1 to about 10 atm for a period of time from about 15 minutes to about 10 hours which is:

(i) sufficient to release at least a part of the crystalline water contained in the hydrated metal compound, and (ii) sufficient to reduce the chloride content in said chloride-containing iron oxide by from about 20 wt % to about 99.9 wt %;

wherein yellow iron oxide decomposes at a temperature from about 150° C. to about 350° C. to release crystalline water;

wherein chloride content of the yellow iron oxide is less than 100 ppm by weight.

2. A process for removing chloride from a regenerated iron oxide comprising from about 800 to about 2000 ppm by weight of chloride, wherein said regenerated iron oxide is produced from a hydrochloric acid waste liquid generated from steel pickling, which process comprises the steps of:

(a) mixing the regenerated iron oxide with from about 5 wt % to about 15 wt % of yellow iron oxide containing crystalline water to form a first mixture;

(b) adding from about 5 wt % to about 50 wt % of water to said first mixture obtained from step (a) to form a second mixture; and (c) heating the second mixture first to a temperature ranging from about 150° C. to about 170° C., and then heating the mixture to from about 750° C. to about 900° C. at a pressure from about 0.5 to about 5 atm for a period of time from about 30 minutes to about 2 hours which is:

(i) sufficient to release at least a part of the crystalline water contained in the hydrated metal compound, and (ii) sufficient to reduce the chloride content in said chloride-containing iron oxide by from about 25 wt % to about 99.9 wt %;

wherein yellow iron oxide decomposes at a temperature from about 150° C. to about 350° C. to release crystalline water;

wherein chloride content of the yellow iron oxide is less than 10 ppm by weight.

\* \* \* \* \*